(12) United States Patent
Heuermann

(10) Patent No.: US 8,450,945 B2
(45) Date of Patent: May 28, 2013

(54) HIGH-FREQUENCY LAMP AND METHOD FOR THE OPERATION THEREOF

(75) Inventor: Holger Heuermann, Aachen (DE)

(73) Assignee: Dritte Patentportfolio Beteiligungsgesellschaft mbH & Co. KG, Schönefeld/Waltersdorf (DE)

( * ) Notice: Subject to any disclaimer, the term of this patent is extended or adjusted under 35 U.S.C. 154(b) by 332 days.

(21) Appl. No.: 12/744,357

(22) PCT Filed: Nov. 27, 2008

(86) PCT No.: PCT/EP2008/066352
§ 371 (c)(1),
(2), (4) Date: May 25, 2010

(87) PCT Pub. No.: WO2009/068618
PCT Pub. Date: Jun. 4, 2009

(65) Prior Publication Data
US 2010/0253238 A1    Oct. 7, 2010

(30) Foreign Application Priority Data
Nov. 28, 2007   (DE) .......................... 10 2007 057 581

(51) Int. Cl.
*H05B 37/02*   (2006.01)
(52) U.S. Cl.
USPC ............................ 315/307; 315/224; 315/276
(58) Field of Classification Search
CPC ...................................................... H05B 37/02
USPC ................. 315/224, 248, 276, 291, 294, 307, 315/308
See application file for complete search history.

(56) References Cited

U.S. PATENT DOCUMENTS

| 4,253,047 | A | * | 2/1981 | Walker et al. ................. 315/248 |
| 4,471,269 | A | * | 9/1984 | Ganser et al. ................. 315/307 |
| 5,019,750 | A |   | 5/1991 | Godyak |
| 5,339,008 | A |   | 8/1994 | Lapatovich et al. |
| 5,534,755 | A | * | 7/1996 | Deavenport et al. ........... 315/307 |
| 5,747,942 | A | * | 5/1998 | Ranganath ..................... 315/224 |

(Continued)

FOREIGN PATENT DOCUMENTS

| DE | 102006005792 A1 | 8/2007 |
| EP | 0377442 A1 | 7/1990 |

(Continued)

OTHER PUBLICATIONS

Int'l Search Report issued on Jun. 4, 2010 in Int'l Application No. PCT/EP2008/066352.

(Continued)

*Primary Examiner* — Tunx X Le
(74) *Attorney, Agent, or Firm* — Panitch Schwarze Belisario & Nadel LLP

(57) ABSTRACT

A high-frequency lamp (10) for low-pressure and high-pressure applications, and a method for the operation thereof, that is particularly suitable for improving the characteristics with regard to efficiency, emission spectrum, cost, and long life, in that the use of an ignition unit is no longer necessary, even at very low high-frequency power, due to an impedance transformer (26) connected downstream of a power amplifier (20), because the application of as high a voltage as possible to an ionization chamber (16) is successfully achieved by the impedance transformation.

12 Claims, 10 Drawing Sheets

U.S. PATENT DOCUMENTS

| | | | |
|---|---|---|---|
| 5,965,988 A * | 10/1999 | Vollkommer et al. | 315/246 |
| 6,313,587 B1 | 11/2001 | MacLennan et al. | |
| 6,362,575 B1 * | 3/2002 | Chang et al. | 315/224 |
| 6,597,130 B2 * | 7/2003 | Lee et al. | 315/294 |
| 6,977,472 B2 * | 12/2005 | Matsubayashi et al. | 315/291 |
| 2002/0140376 A1 * | 10/2002 | Kamata et al. | 315/276 |
| 2004/0108803 A1 | 6/2004 | Scholl et al. | |
| 2007/0103645 A1 | 5/2007 | Takeuchi et al. | |
| 2008/0084170 A1 * | 4/2008 | Hopkins | 315/307 |
| 2009/0165763 A1 | 7/2009 | Heuermann | |

FOREIGN PATENT DOCUMENTS

| | | |
|---|---|---|
| EP | 0 721 203 A2 | 7/1996 |
| EP | 1 298 707 A2 | 4/2003 |
| WO | 2007/126899 A2 | 11/2007 |
| WO | 2008/048972 A2 | 4/2008 |
| WO | 2008/048978 A2 | 4/2008 |

OTHER PUBLICATIONS

Written Opinion Issued on Jun. 4, 2010 in Int'l Application No. PCT/EP20081066352.

Int'l Preliminary Report on Patentability issued on Jun. 8, 2010 in Int'l Application No. PCT/EP2008/066352.

Translation of Int'l Preliminary Report on Patentability issued on Sep. 10, 2010 in Int'l Application No. PCT/EP2008/066352.

* cited by examiner

HIGH-FREQUENCY LAMP AND METHOD FOR THE OPERATION THEREOF

CROSS-REFERENCE TO RELATED APPLICATIONS

This application is a Section 371 of International Application No. PCT/EP2008/066352, filed Nov. 27, 2008, which was published in the German language on Jun. 4, 2009, under International Publication No. WO 2009/068618 A2 and the disclosure of which is incorporated herein by reference.

BACKGROUND OF THE INVENTION

The present invention relates to a high-frequency lamp, which hereinafter is sometimes briefly referred to as an HF lamp. The present invention further relates to a method for operating such a high-frequency lamp.

High-frequency lamps are generally known. The task of each lamp, hence also of a high-frequency lamp, is to emit light as efficiently as possible. Each lamp converts energy into light more or less efficiently. A great amount of dissipated heat often develops during the conversion.

Further tasks of lamps are manifold. The emitted light spectrum is often very crucial for the purpose of use. Just the same, some applications such as vehicle headlights and projectors require lamps having light sources that are as spot-shaped as possible.

The description of the prior art in the following shall be restricted to electric lamps. These may be roughly differentiated into light-emitting diodes and lamps having a glass body. The latter group shall be treated in the following. It is subdivided into incandescent lamps and gas discharge lamps.

Incandescent lamps comprise a filament (e.g. of tungsten) within the glass body, and a protective gas. The filament with a melting point of over 3000° C. is typically heated to 2500° C. According to Planck's radiation law, a light spectrum corresponding to daylight thereby does not thereby result yet for the incandescent lamp, as it rather radiates distinctly more yellow-reddish. Incandescent lamps are operated at a direct or alternate voltage of frequencies up to the kHz range. They do not require any ballast electronics.

Gas discharge lamps, which are in relationship to the present invention, are light sources that use a gas discharge and thereby make use of the spontaneous emission by atomic or molecular-electronic transitions and the recombination radiation of a plasma generated by electric discharges. The gas contained within the bulb of quartz glass (ionization chamber) is often a mixture of metal vapors (e.g. mercury) and noble gases (e.g. argon) and possibly other gases such as halogens. Gas discharge lamps are classified into low-pressure and high-pressure discharge lamps. The former use a glow discharge and the latter an arc discharge. All of these lamps require a ballast. The same contains a starter, which ionizes the gas by means of a voltage pulse in the kV range. Moreover, for permanent operation, the frequency is converted, if necessary, into the kHz range. As a consequence, these lamps are not lamps that are operated in the MHz or GHz range by means of a high-frequency signal.

A special form of the gas discharge lamp is the sulfur lamp. It comprises of a quartz glass globe filled with sulfur and argon as an ionization chamber. Within the glass globe, plasma is generated by way of high-frequency radiation. In contrast to conventional gas discharge lamps, the sulfur lamp does not require any electrodes because of the use of waveguides. Due to the extremely high temperatures developing at the quartz glass of the globe, the same is kept in rotation and thereby cooled. This is caused by a lower column that comprises turbine blade-like fan formations. It turns in the stream of air that is generated within the magnetron (HF energy source of about 1500 W) by a ventilator. In case of the failure of this cooling, the glass globe would melt after 20 seconds.

The luminous efficiency of sulfur lamps is similarly as high as that of energy-saving lamps (fluorescent lamps). They have a balanced light spectrum of a color temperature of approximately 5700 K to 6000 K and, therefore, are very effective white light sources. By regulating the power of the magnetron, sulfur lamps can be dimmed rather well with their color spectrum remaining stable. Due to the high luminous flux, the lamps are in most cases not directly installed in the place of application. Instead, the light is guided into the room by means of optical conductors. This makes this type of lamp easy to maintain.

Due to the relatively high expenditure in terms of devices (power supply for the magnetron, shielding of microwaves, and temperatures), this lamp was commercially not available for a long time. Since 2006, LG Electronics has produced sulfur lamps under the designation "Power Lighting Systems (PLS-lamps, also commercialized as sulfur plasma lamps). They are frequently used as lighting in television studios or as artificial lighting for plants.

From "Emission Properties of Compact Antenna-Excited Super-High Pressure Mercury Microwave Discharge Lamps," T. Mizojiri, Y. Morimoto, and M. Kando in Japanese Journal of Applied Physics, Vol. 46, No. 6A, 2007, and "Numerical analysis of antenna-excited microwave discharge lamp by finite element method," M. Kando, T. Fukaya and T. Mizojiri; $28^{th}$ IC-PIG, Jul. 15-20, 2007, Prague, Czech Republic, high-frequency lamps are known that operate at small high-frequency powers (30-100 W) and comprise, instead of the waveguide coupling, a coupling over a TEM line (coaxial line) including an inner conductor electrode. Since these lamps take advantage of the long wires of a gas discharge lamp as an antenna, these lamps should be referred to in the following, in a more appropriate way, as HF antenna lamps.

These lamps, just as the sulfur lamps, do not comprise an impedance transformer, however. The requirements for the frequency stability of the high-frequency generator hence are low in these lamps.

A disadvantage of these known gas discharge lamps however is that the technology for these lamps requires expenditure and, therefore, is costly. In addition, they are only available as a power lamp of approximately 1500 W. Moreover, all of the gas discharge lamps known to date need a separate circuit for igniting the plasma. For this, voltages in the kV range are necessary. In the hitherto known high-frequency lamps, which can do without a circuit for the ignition, the disadvantage arises, in particular, that they need very much power (over 30 W microwave power). Furthermore, gas discharge lamps act as antennas. In practice, this has the significant disadvantage that high-frequency radiation is emitted to a higher degree. Such lamps are not allowed due to this radiation.

The discharge lamps used as energy-saving lamps cannot be dimmed, a fact that represents a very important disadvantage in practical use.

Since the previous high-frequency lamps do not have impedance transformers in the high-resistance range, very high currents flow through the electrodes. Since these are made of materials such as tungsten and have a poor surface quality, the ohmic losses are very high.

One task of the present invention correspondingly consists in proposing a high-frequency lamp that avoids the above-mentioned disadvantages or at least reduces the effects thereof, in particular in proposing a high-frequency lamp that can be used both as a high-pressure and a low-pressure gas discharge lamp and is especially suited for improving properties such as efficiency, emission spectrum, cost, and durability. A further task of the present invention consists in proposing a method for the operation of such a high-frequency lamp.

BRIEF SUMMARY OF THE INVENTION

The above task is solved according to the present invention, on the one hand, by a high-frequency lamp having the features recited in the claims. For this purpose, in a high-frequency lamp comprising a signal generating portion for generating a high-frequency signal, and connected downstream of same, hence the signal generating portion, an ionization chamber, in which the signal generating portion comprises a switchable high-frequency oscillator, and at the output thereof, a power amplifier for increasing the power of the high-frequency signal, and in which the ionization chamber that comprises at least one gas-filled glass bulb, has at least one electrode associated, it is provided for an impedance transformer that is connected to the or each electrode to be connected downstream of the amplifier.

As to the method, this task is solved according to the present invention by the features recited in the claims. In this case, it is provided that for the operation of a high-frequency lamp of the type as outlined in the beginning and further described in the following, the high-frequency signal is generated by the high-frequency oscillator, wherein the power of the high-frequency signal is increased by the power amplifier connected downstream, that the high-frequency signal is transformed into the high-voltage range by the impedance transformer connected downstream of the power amplifier, and that the transformed high-frequency signal is supplied to the electrode.

The advantage of the present invention firstly consists in that in the signal generating portion of the high-frequency lamp, a high-frequency oscillator can be used that may be varied via voltage and is available as a low-cost module. In addition, the output signal of the high-frequency oscillator, which typically is in the mW range, may be raised into the one-digit to two-digit watt range by a power amplifier that has high efficiency and is low-cost. Finally, the use of an impedance transformer, which is used for applying a highest possible voltage to the ionization chamber, makes the use of an ignition unit superfluous even at very low high-frequency powers. Furthermore, a distinctly higher ionization rate, and hence higher efficiency, is achieved by the large, permanently applied electric field intensity. Since the high-frequency power is permanently coupled in by the impedance transformer at a high voltage, the ohmic losses at the electrode tips, which are manufactured of poorly conducting materials, are lower, whereby the efficiency increases. In addition, a high number of switching options as an impedance transformer is available due to the operation in the high-frequency range so that the same may be achieved even with low-cost components such as capacitors and coils.

Apart from that, the structure of a high-frequency lamp having such a signal generating portion is also advantageous in that a high-frequency emission does not occur outside the high-frequency lamp, and same is, therefore, suitable for approval.

For the electrode associated to the ionization chamber, various materials may be employed and forms used, whereby the efficiency and range of application may be improved to the same extent.

Advantageous configurations of the present invention are the object of the dependent claims. Back-references used in this case refer to the further development of the subject of the main claim by the features of the respective dependent claim; they are not to be understood as a disclaimer to the achievement of an independent physical protection for the feature combination of the back-referenced subclaims. Furthermore, it has to be assumed that with respect to an interpretation of the claims in case of a more detailed specification of a feature in a subordinate claim, such a limitation is not given in the respective preceding claims.

One preferred configuration of the high-frequency lamp provides for the signal generating portion to comprise, in addition, a coupler connected downstream of the power amplifier, particularly arranged between the power amplifier and the impedance transformer, a high-frequency detector, and a processing unit, wherein a high-frequency signal reflected at the electrode when the high-frequency lamp is in operation, can be supplied to the high-frequency detector via the coupler, and wherein a control or actuating signal, which can be generated by the processing unit based on an output signal of the high-frequency detector, can be supplied to the high-frequency oscillator for optimizing the high-frequency signal based on the reflected signal. By detecting the reflected high-frequency signal, the optimization thereof is possible, e.g. after the ignition of the high-frequency lamp for a reduction of the high-frequency signal which is then possible. In addition or as an alternative, a regulation of the high-frequency oscillator based on the reflected high-frequency signal is also possible.

When the high-frequency lamp is configured such that a signal splitter having a first and second signal splitter output is connected downstream of the high-frequency oscillator, and the power amplifier is connected to the first signal splitter output, wherein a means for phase-shifting—hereinafter also referred to as a "phase-shifter" and realized e.g. in the form of a 180° long conductor—, a second amplifier, a second impedance transformer, and a second electrode are connected in series, a high-frequency oscillator may apply an anti-phase signal to the ionization chamber. This embodiment will be referred to in the following as a symmetric set-up for distinguishing from the initially described embodiment having only one power amplifier, one impedance transformer, and one electrode.

Further preferred, the impedance transformer, or in the case of a high-frequency lamp having a symmetric set-up, the impedance transformer and/or the second impedance transformer is/are provided to comprise a single-stage or multi-stage transformingly active section, with the advantage of the single-stage transformation residing especially in its compactness and robustness, whereas an improvement of the efficiency of the impedance transformer may be achieved by means of a multistage transformation.

When the or each electrode is dielectric and, therefore, made of a dielectric material, in particular formed by a metal core enclosed by a dielectric cover, excellent efficiency ratios and highest color temperatures may be achieved.

When the or each electrode is realized to be loop-like, the occurrence of undesired cavity modes may be avoided, with this being all the more true for the high-frequency lamp with a symmetric set-up.

When the glass bulb is filled with two gases, in particular exactly three gases, having different emission spectra, different colors may be ionized by appropriately changing the frequency of the high-frequency signal. When the high-frequency signal comprises a frequency spectrum, which is suited for ionizing more than one gas, a color mixture correspondingly results for the perceived emitted light. In this manner, two, three, or more colors may be directly ionized by a narrow-band high-frequency signal, whereas an ionization of several colors and by the superposition thereof a generation of mixed colors is possible by means of correspondingly selected broadband high-frequency signals. This embodiment of the high-frequency lamp is suited for light effects, such as self-luminous advertising means or else display instruments.

One preferred alternative embodiment to the previously described embodiment, provides for the ionization chamber to comprise at least two glass bulbs, in particular three glass bulbs, each individually filled with a gas having different emission spectra, and wherein each glass bulb has an electrode associated for supplying a high-frequency signal. In this embodiment, each glass bulb outputs the respective characteristic emission spectrum upon the ionization of the gas contained therein. Expressed in a simplified manner, each glass bulb thus radiates exactly one color. By controlling the electrode associated to the respective glass bulb, the emission of a first or second (or third or possibly further) color(s) or the color mixture, which is possible when several colors are simultaneously emitted, may be achieved for the high-frequency lamp as a whole. This embodiment of the high-frequency lamp is also an option for generating light effects. In addition, there is also the at least fundamental suitability as an imaging element in monitor-type display devices. Usually, three glass bulbs will be provided for the latter case which—according to the known RGB model—are intended for irradiating red, green, and blue light. In connection with this aspect of the invention, a plurality of such high-frequency lamps arranged in line and column form may be combined into one display device, hence a monitor, a TV set, or the like. Insofar, the present invention also relates to a method suited for operating such a display device, in which each high-frequency lamp covered by the same is operated such that at least two high-frequency signals generated by the high-frequency oscillator and supplied to the at least one electrode, or at least two high-frequency signals are generated by the high-frequency oscillator, and each high-frequency signal is supplied to exactly one of the at least two electrodes. In this manner, each high-frequency lamp corresponding to exactly one image point, one "pixel" in the visible image, which can be generated by the display device, may be individually controlled and a desired color emission, a desired chrominance for the respective image point/the respective pixel achieved.

With respect to the inventive method as described above, the present invention also provides further realizations of the methods for the operation of the respective physical further developments of the high-frequency lamp.

For the operation of one of the preferred embodiments of the high-frequency lamp, it is provided for the high-frequency detector to detect the high-frequency signal that is reflected at the electrode upon an ignition of the high-frequency lamp and forwarded via the coupler, and the processing unit to adapt, in particular to vary by a predetermined positive or negative value, the control signal based on the output signal of the high-frequency oscillator for optimizing the high-frequency signal. With respect to the adaptation of the high-frequency signal, the advantage here, especially, is that before or during the ignition of the high-frequency lamp, the ionization chamber acts like a small capacitance having a high-ohmic parallel resistance, while immediately after the occurred ionization (lighting operation) the capacitance increases and the parallel resistance reduces, thus consequently the resonance frequency, the frequency to be used for the high-frequency signal, changes after the occurred ignition. For this reason, the signal generation, after the occurred ignition of the lamp, must be in the position to perform a rapid one-time frequency hopping, the high-frequency signal is hence "adapted" to the situation of the lighting operation. This means for the components coupler and high-frequency detector that, provided that the high-frequency lamp ignites, a distinctly higher HF power is reflected at the electrode. This power reaches the coupler and, reduced by the same, is supplied to the high-frequency detector. The changed output signal of the high-frequency detector is received in the processing unit, and the same performs the frequency hopping for the lighting operation.

With respect to the aspect of the variation of the high-frequency signal, the advantage resides especially in that in the case of a variation of the high-frequency signal by a small positive and a small negative value, the reflected powers for several frequency points, e.g. for a mean frequency, a reduced frequency and an increased frequency, are measured, and the value having the least reflected power is used as a new initial value for the high-frequency signal. This regulation is repeated continuously or to predefined or predefinable times. Thus, it is assured that as much HF power as possible is always fed into the ionization chamber and as little as possible is converted into dissipated heat.

For the operation of the high-frequency lamp having a symmetrical set-up, it is correspondingly provided for the signal splitter to split off a second high-frequency signal from the high-frequency signal in particular in such a manner that a high-frequency signal remaining as a high-frequency signal, and the second high-frequency signal are at least essentially identical, the means for phase-shifting to shift the second high-frequency signal in phase, the second power amplifier connected downstream to increase the power of the phase-shifted second high-frequency signal, and the second impedance transformer connected downstream to transform the second high-frequency signal in one stage or several stages and to forward it to the second electrode.

For other configurations of the high-frequency lamp it is provided for at least two high-frequency signals to be generated by the high-frequency oscillator and supplied to the at least one electrode, or at least two high-frequency signals to be generated by the high-frequency oscillator, and each high-frequency signal to be supplied to exactly one of the at least two electrodes.

In the following, one exemplary embodiment of the present invention will be explained in more detail based on the drawing. Objects or elements corresponding to each other are given the same reference numerals throughout the figures.

The or each exemplary embodiment is not to be understood as a restriction of the invention. Rather, numerous variations and modifications are possible within the scope of the present disclosure, in particular such variants, elements and combinations and/or materials that, for instance, by combination or a modification of individual features, respectively elements or method steps described in connection with the general or specific part of the description and/or contained in the drawing, are obvious to the skilled person with respect to the solution of the task and, by combinable features, lead to a novel subject matter or novel method steps, respectively method step sequences, also as far as they concern manufacturing or working methods.

BRIEF DESCRIPTION OF THE SEVERAL VIEWS OF THE DRAWINGS

The foregoing summary, as well as the following detailed description of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. Unless specifically set forth herein, the terms "a," "an" and "the" are not limited to one element, but instead should be read as meaning "at least one."

Figure 1:
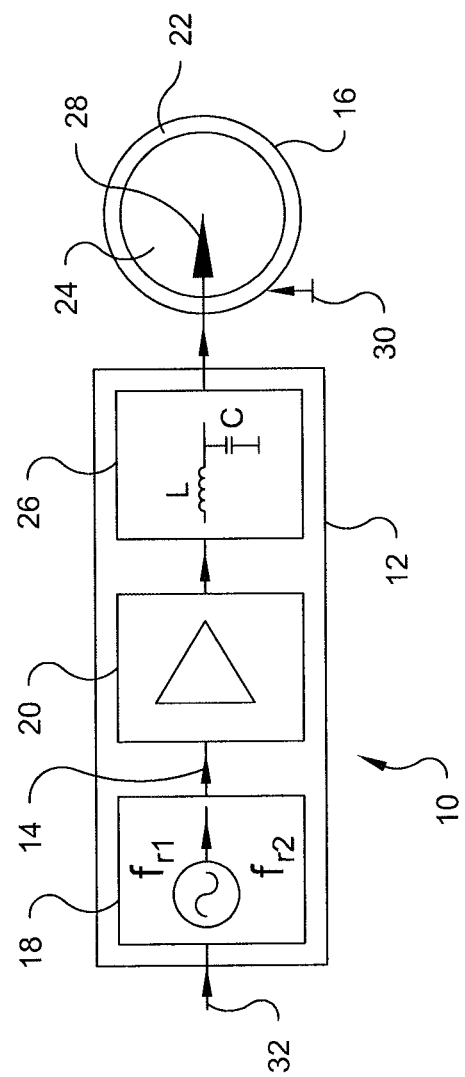
FIG. 1 is a simplified schematic block diagram of a high-frequency lamp for a so-called actuating operation according to a preferred embodiment of the present invention.

Referring to the drawings in detail, wherein like numerals indicate like elements throughout the several views, FIG. 1 shows the construction of one embodiment of a high-frequency lamp according to the present invention in a schematically simplified manner and designated by 10 as a whole. The same comprises a signal generating portion 12 for generating a high-frequency signal 14, and a ionization chamber 16 connected downstream of the signal generating portion. The signal generating portion 12 in turn comprises a high-frequency oscillator 18 and, at the output thereof, a power amplifier 20 for increasing a power of the high-frequency signal 14. The ionization chamber 16 in turn comprises at least one gas-filled glass bulb 22 (gas 24, if necessary supplemented with metal vapors and/or halogens), to which an electrode 28 is associated that can be shaped in almost any manner. For the signal generating portion 12, an impedance transformer 26 connected at its output to the or each electrode 28, is provided to be connected downstream of the power amplifier 20. An outer shielding of the signal generation circuit forms a grounding 30, with which the electrode 28 is in capacitive coupling which guides the high-frequency signal 14 into the interior of the ionization chamber 16 as a feedthrough electrode.

In this manner, the set-up of a high-frequency lamp 10 (HF lamp) based on a relatively narrow-band high-frequency signal 14 (in the three-digit MHz range and the entire GHz range) becomes possible, which is transformed into a high-voltage range by means of the impedance transformer 26, and a wide arc range that can be shaped in almost any manner and does not reach to the grounding 30, since it ends on an inner surface of the glass bulb 22, hence e.g. on a quartz glass used for the manufacture thereof.

The impedance transformer 26 provided makes the use of an ignition unit superfluous, which was required to date for the high-frequency lamp 10. Moreover, a distinctly higher ionization rate, and thus a higher efficiency ratio, is achieved by the large permanently applied electric field intensity. Since the high-frequency power is permanently coupled in at a high voltage, the ohmic losses at the tips of the or each electrode 28 that has/have only poorly conducting materials, are lower, a fact that again increases the efficiency. A simple embodiment of an impedance transformer 26 comprises a coil and a capacitor. When 0402-SMD components are used, the space requirement is below 2 mm$^2$ and the cost below 4 Cent.

The higher the frequency of the high-frequency signal 14 is selected, the smaller the voltage applied to the electrode 28 can be. Already in the lower GHz range, for which a number of low-cost electronic components is available, the voltage can be reduced to one-digit kV values in the lower range, depending on the desired arc length. This reduction of the maximum voltage permits realization with clearly lower-cost materials and components.

Since one works with narrow-band high-frequency signals 14, a HF-suitable set-up is very easily possible. For instance, lambda/2 lines with all their advantages may be used now. This means that lines are not required to exhibit the desired characteristic impedance. This simplifies e.g. a high-frequency-compatible design of the high-frequency lamp 10.

The electrode 28 now radiates the energy over several paths or a large surface. The electromagnetic energy generates a HF current in the ionized area around the electrode 28, which current, due to the heating, emits radiation energy in the optical range in the kind of an arc. Thus, the energy release from the electrode 28 no longer takes place as a current, but rather as an electromagnetic field. The electrode 28 is no longer loaded by the current flow. First measurements have shown that no material escapes. The high-frequency lamps 10 can thus be used over an extended service life.

Highly integrated and low-cost high-frequency power amplifiers for GSM mobile radio applications and handsets, which exhibit efficiency ratios of more than 60%, are possible as power amplifiers 20. Efficiency ratios of 80% can be achieved in the so-called class E operation.

Short lines may be realized at almost zero-loss in the lower GHz range. The potential for a very good efficiency and consequently a highly integrated option of realization is thus given for the signal generating portion 12 functioning as a HF ballast unit, which may preferably be integrated into a base of the high-frequency lamp (lamp base).

The choice of materials for the electrode structure also permits the use of a dielectric material apart from metal. The electrode 28 may consist, for example, of a ceramic material having a high dielectric constant and a very high melting point. This configuration is a very decisive issue in terms of color temperature and the often-targeted spectrum that corresponds to daylight. A distinctly improved efficiency may thereby also be achieved.

An additional advantage of this lamp compared to all energy-saving lamps is that the high-frequency lamp proposed here can be dimmed.

Books on physical basics teach that the ionization of a gas only takes place by the electron impact ionization excited by an electron beam injection, the thermal ionization at extremely high temperatures ($10^6$ K) or the photo ionization by means of ultraviolet light. The inventor has further realized set-ups in the GHz range based on experimental physics, by means of which ionized areas developed through the introduction of a relatively small amount of high-frequency energy. These results are congruent to other published results, e.g. "Experimente mit Hochfrequenz" (experiments using high-frequency) by H. Chmela, Franzis Publishers, which however have been conducted in the MHz range. This shall be referred to as high-frequency ionization in the following. Furthermore, in "A Novel Spark-Plug for Improved Ignition in Engines with Gasoline Direct Injection (GDI)" by K. Linkenheil et al., IEEE Transactions on Plasma Science, vol. 33, No. Oct. 5, 2005, this high-frequency ionization is proven and it is emphasized that additional UV radiation permits this ionization at lower electric field intensities.

If an ionized gas has the same number of electrons and ions, it is a gas on average free of space charge and is called plasma.

Based on Maxwell's equations, it can be shown that the following mathematical correlations are valid for an ionized gas:

Relative dielectric constant:

$$e_r = 1 - (Ne^2)/e_0/m/(u^2+w^2) \quad (1)$$

Relative conductivity:

$$k = (Ne^2 u)/m/(u^2+w^2) \quad (2)$$

Plasma frequency:

$$wp = e(Ne^2/m/e_0) \quad (3)$$

including the quantities:
- N: number of electrons per volume,
- e: charge of one electron,
- m: mass of one electron,
- $e_0$: electric field constant,
- u: frequency of the collisions between the electrons and the gas molecules;
- w: frequency of the high-frequency signal.

Detailed investigations show that below the plasma frequency, electromagnetic energy is not capable of propagating and losses do not occur in the plasma. The space in contrast exhibits a real characteristic field impedance Zf above the plasma frequency. Zf drops towards higher frequencies and exponentially approximates the free-space resistance $Z_0$ of about 377 W. This means that lower voltages are needed at higher frequencies for transforming the same powers as at lower frequencies. Equation (2) shows that the (small) resistance rises and hence the losses rise at an increasing frequency. Consequently, the gases may be better heated at higher frequencies.

An analysis of the atmosphere for the transmission properties of the HF signals renders that in the two-digit to three-digit MHz range, the radiation is absorbed almost not at all, whereas at 50 GHz the entire radiation is attenuated as a molecular absorption in hydrogen, respectively oxygen. In the lower MHz range, so-called Tesla transformers can be used for manufacturing generators of 100 W having an output voltage of 5 kV, and to generate spark gaps of a length of 10 cm in air, cf. also the already mentioned literature "Experimente mit Hochfrequenz", l. c. The inventor has already produced a 1 cm long spark gap at 2.5 GHz using a transmitter of 10 W and a voltage of 2 kV.

The signal generation in the high-frequency lamp 10 will be described in the following: In the initial state (ignition operation), the ionization chamber 16 acts as a small capacitance having a high-ohmic parallel resistance. Immediately after the occurrence of the ionization (lighting operation), the capacitance augments and reduces the parallel resistance. Consequently, the resonance frequency $f_r$ changes after the occurred ignition. For this reason, it is advantageous for the signal generation, hence the functionality of the signal generating portion 12, to be in the position to make a rapid, one-time frequency hopping from $f_{r1}$ to $f_{r2}$ after the ignition of the high-frequency lamp 10 has taken place. It is important that after the occurred ignition the output resistance $Z_{aus}$ of the signal generation unit 12 corresponds, respectively is matched to the input resistance $Z_{ein}$ in a conjugate-complex manner.

The electromagnetic fields and the input resistance $Z_{ein}$, before the time of the lamp's ignition may be calculated by means of so-called 3D HF-simulators. Of course, simulators do not consider the high-frequency ionization and ignition. If the changing input resistance $Z_{ein}$, after the ignition is to be determined, this is possible by a so-called hot impact parameter measurement. Same is known from the measuring of electric properties of power transistors.

The above-mentioned frequency hopping may be realized either by an oscillator 18 variable by voltage, e.g. in a design as a so-called VCO (voltage controlled oscillator), or by a rapid electronic switchover between two solid-state oscillators. Since VCOs in the lower GHz range are commercially available as extremely low-cost modules, these will be preferred if possible. In FIG. 1, the high-frequency oscillator 18 is illustrated as a switchable high-frequency oscillator 18. A control signal 32 is applied to same. The high-frequency signal 14, hence the output signal of the oscillator 18, which is typically in the mW range, is raised into the one-digit or two-digit W range by means of the power amplifier 20. Highly integrated power amplifiers 20 in the lower GHz range exhibit efficiency ratios of far more than 60% and are extremely low-cost and thus predestined.

For a possibly large voltage being present in the ionization chamber 16, an impedance transformation is performed by means of the impedance transformer 26. For this purpose, a very wide spectrum of circuits is available in the case of HF. A low-cost circuit consists of capacitors and coils (multistage gamma transformer) and may be looked-up in "Hochfrequenztechnik" (high-frequency technology) by H. Heuermann, Vieweg Publishers. The impedance transformer 26 can be of a single-stage or multistage design. Apart from the stepping-up of the impedance level and thus also of the voltage, the circuit comprised by the impedance transformer 26 should also include an adaptation of the electrode 28 of the ionization chamber 16. The output impedance $Z_{aus}$ should possibly be in the two-digit Ω range or in the one-digit kΩ range or higher.

Voltage at the electrode 28 in the ionization chamber 16 is calculated directly from the output power of the amplifier 20 $P_{out}$ and $Z_{aus}$:

$$U = e(P_{out} Z_{aus}) \quad (4)$$

Consequently, a working point should be selected so that same is clearly above the plasma frequency wp.

Figure 2:
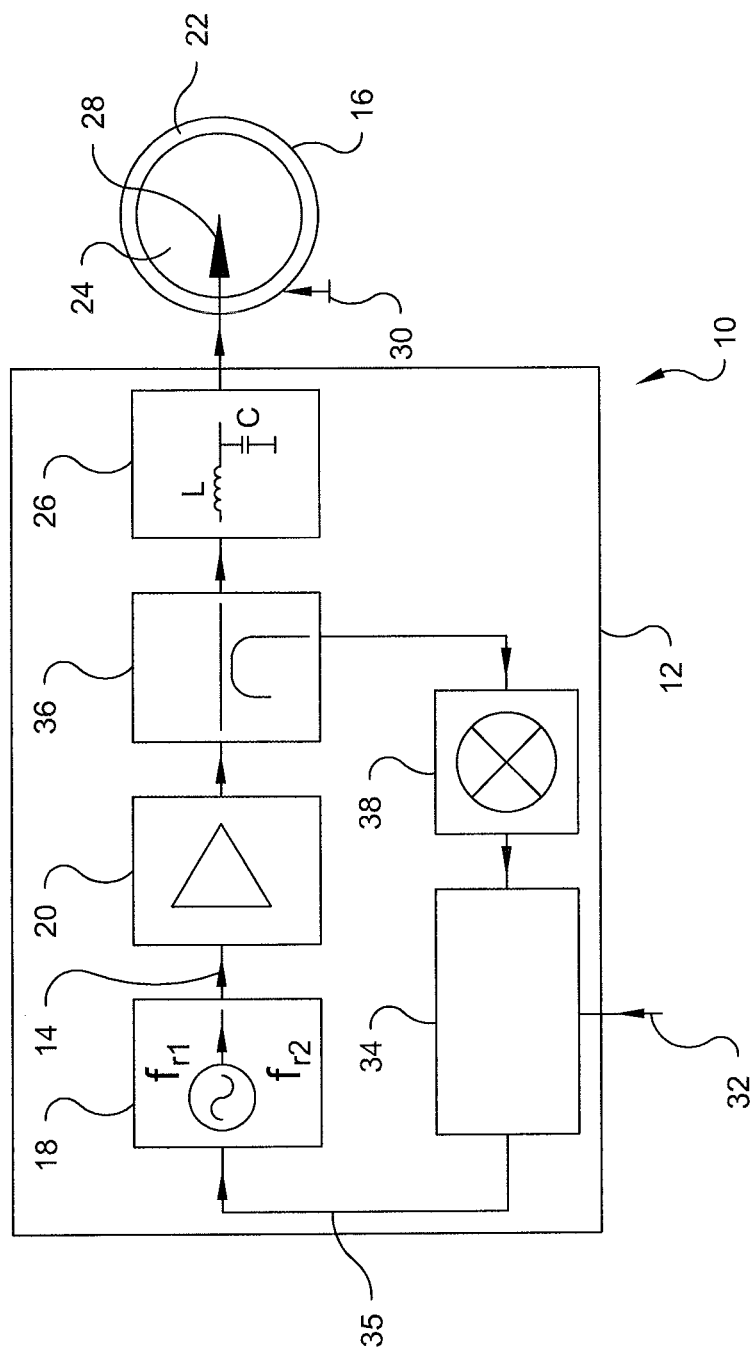
FIG. 2 is a simplified schematic block diagram of the high-frequency lamp for a control operation.

For achieving the best possible efficiency, one preferred embodiment of the present invention provides for as little high-frequency power to be reflected as possible. A circuit such as illustrated in FIG. 2 in a schematically simplified manner is particularly suited for this purpose. The circuit comprised by the signal generating portion 12 is activated by the control signal 32 (cf. also FIG. 1). A microprocessor-type processing unit 34 adjusts the high-frequency oscillator 18 to a frequency $f_{r1}$ for the ignition operation. A control signal, which is generated or can be generated by the processing unit 34, is referred to as an actuating signal 35 for distinguishing from the control signal 32. The generated high-frequency signal 14 is increased in its power via the amplifier 20, passes through a low-loss coupler 36 and, via the impedance transformer 26, reaches the electrode 28 of the ionization chamber 16 that keeps a gas mixture 24 enclosed by the quartz glass cover of the glass bulb 22. Provided that the high-frequency lamp 10 ignites, a clearly higher HF power is reflected at the electrode 28. This power reaches the coupler 36 and, attenuated through same, is supplied to a high-frequency detector 38.

A thereby changed output signal of the high-frequency detector 38 is received by the processing unit 34, which causes a frequency hopping for the lighting operation by adjusting the high-frequency oscillator 18 to the frequency $f_{r2}$.

There is following optimization for this lighting operation: The processing unit 34 varies the frequency of the high-frequency signal 14 about the frequency $f_{r2}$ by a small positive and a small negative value $f_{rA}$, and outputs a corresponding actuating signal 35. The reflected powers are measured for three frequency points $f_{r2}-f_{rA}$, $f_{r2}$, $f_{r2}+f_{rA}$. The value having the least reflected power is then the new initial value. This regulation is repeated continuously. Thus, it is assured that as much HF power as possible is always fed into the ionization chamber 16 and as little as possible is converted into dissipated heat.

Figure 3:
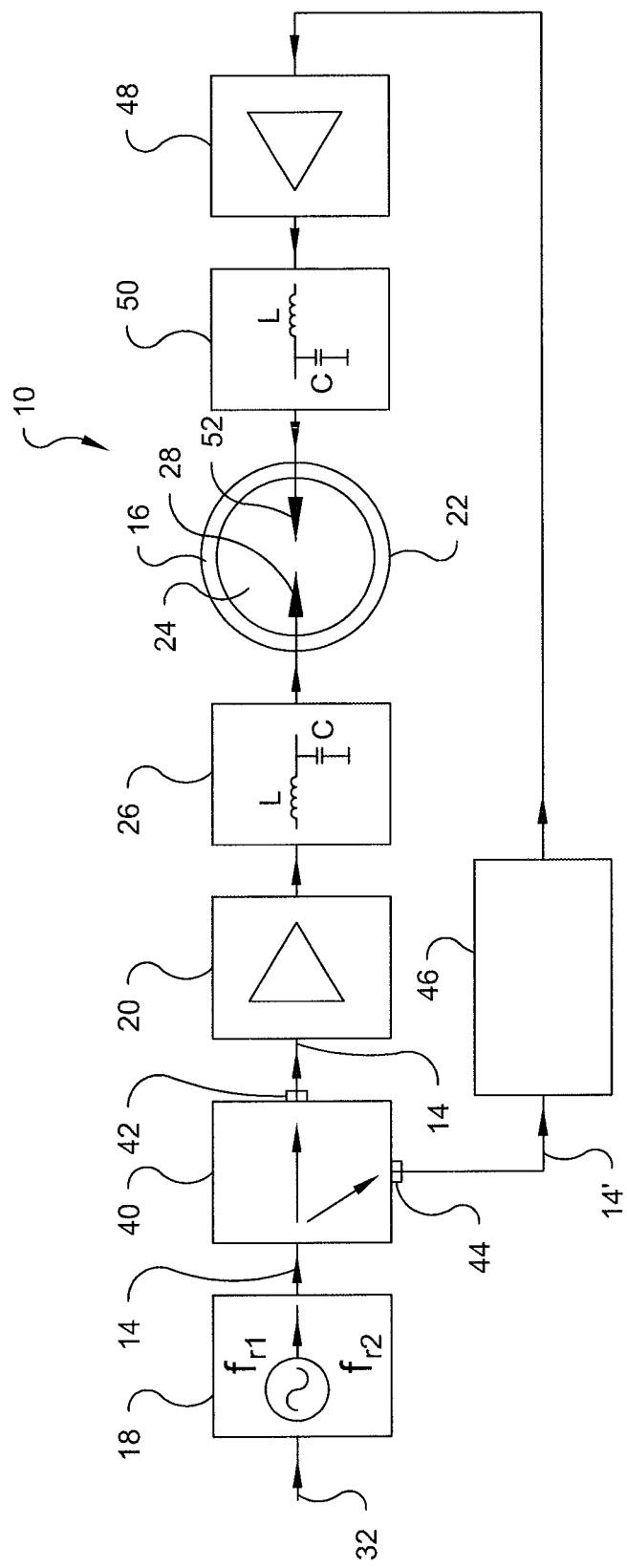
FIG. 3 is a simplified schematic block diagram for a high-frequency lamp having a differential drive ("symmetric set-up")

A preferred embodiment of the high-frequency lamp 10, which is characterized by a symmetric set-up, is shown in FIG. 3. In this case, a low-loss signal splitter 40 having first and second signal splitter outputs 42, 44 is connected downstream of the high-frequency oscillator 18. The power amplifier 20 (cf. FIG. 1 or FIG. 2) is connected to the first signal splitter output 42, followed by the circuit components already described in FIG. 1 or FIG. 2. A means for phase-shifting 46 is connected to the second signal splitter output 44, followed by a second power amplifier 48, a second impedance transformer 50 and a second electrode 52 connected in series. The high-frequency signal 14 generated by the high-frequency oscillator 18 is split by the signal splitter 40 in particular into two portions of equal size, the high-frequency signal 14 and a second high-frequency signal 14'.

An "upper" signal path via amplifier 20, transformer 26 up to the first electrode 28 (left hand) is unchanged compared to the situation described based on FIG. 1 or FIG. 2. In a "lower" signal path, a phase-shifter of 180° phase-shift is firstly present as a means for phase-shifting 46, which can be realized, for example, as a 180° long line. Thereafter, the antiphase signal is increased in power by the second amplifier, and is increased in voltage by the second impedance transformer 50 to be finally supplied to the second electrode 52 (right hand).

This construction has the advantages that the amplification of the two amplifiers 20, 48 simply adds without additional wiring, that the plasma within the ionization chamber 16 is placed in the center in a spot-shape, and that the glass bulb 22 (cf. FIG. 1 or FIG. 2; reference numeral 30) is not required to be connected to ground.

This high-frequency lamp 10 having the illustrated actuating operation, of course may also be used in the control operation, hence in a design as illustrated in FIG. 2 and described above in this context.

Figure 4:
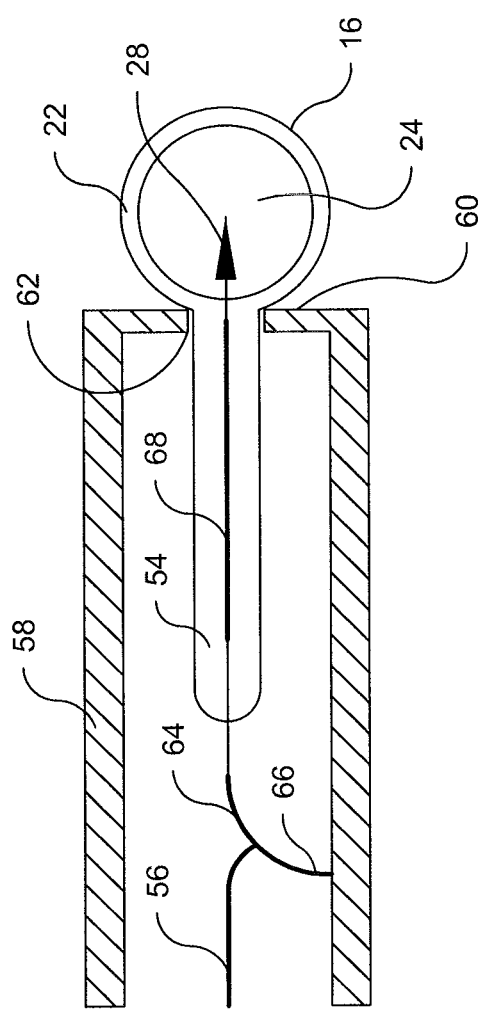
FIG. 4 is a lamp head having a single-stage impedance transformation, hence a single-stage transformingly active section.

Independent of the number of impedance transformations (FIG. 1, FIG. 2: only one impedance transformer 26; FIG. 3: two impedance transformers, namely impedance transformer 26 and second impedance transformer 50), a device for impedance transformation as shown in FIG. 4 is advantageous in the signal generation. FIG. 4 shows as a lamp head the ionization chamber 16 of a high-pressure gas discharge lamp 10 (cf. FIG. 1) having a glass bulb 22 and a pressure insulation portion 54 (glass feedthrough). A short feed line 56, which virtually forms the entrance of the impedance transformer 26, 50, may be a pure coaxial line having a characteristic impedance of 50 ohm. These elements, as well as the remainder of this distributed circuit, are situated in a circular tube 58 comprising at the end a washer-like cap 60 having a bore 62. This tube 58 forms the grounding for this asymmetric distributed circuit, and the cap 60 forms the grounding for the electrode 28. The feed line 56 is in connection with first and second bent lines 64, 66. The first bent line 64 is in connection with an inner conductor 68, e.g. made of molybdenum, which is arranged in the glass feedthrough 54. This conductor in turn guides the high-frequency signal 14 (cf. FIG. 1) to the electrode 28, which is surrounded by the gas or gas metal vapor mixture.

From a standpoint of circuit engineering, the second bent line 66 is a small inductance connected to ground. The first bent line 64 and the inner conductor 68 form a clearly larger inductance. The head part of the electrode 28 and the associated grounding can be described as a small capacitor and a high-ohmic load resistance connected in parallel. Consequently, the circuit forms a parallel resonance circuit having an inductance coupled. The inductance must be in resonance with the capacitance. The voltage at the coupling point in the starting area of the feed line 56 is clearly stepped up towards the electrode 28.

This single-stage impedance transformation is very compact, simple, and robust. A therewith corresponding single-stage transformingly active section comprises at least the feed line 56 and the first and second bent lines 64, 66. The direct connection of the inner conductor 68 via the first and second bent lines 64, 66 to ground, reduces the temperature of the electrode 28. The mechanical structure is stable and compact. However, a multistage transformation may offer advantages in case of very high pressures and/or very small powers or else for the improvement of the efficiency. Transformations using concentrated components that are known, cf. H. Heuermann "Hochfrequenztechnik", l.c., exhibit relatively poor qualities and thus relatively important losses. One embodiment, improved again in this respect, is illustrated in FIG. 5.

Figure 5:
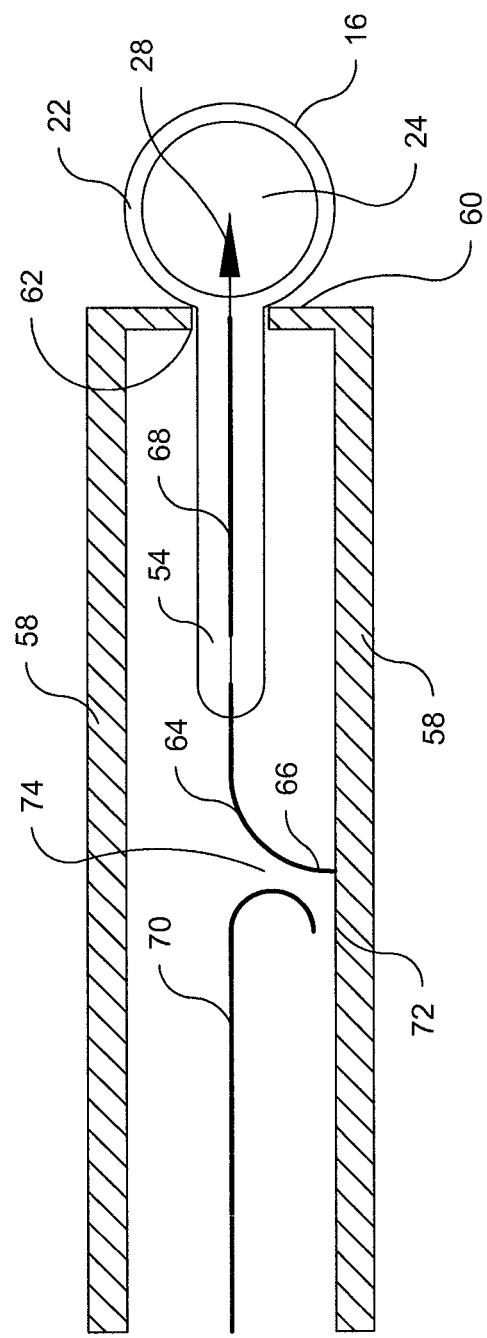
FIG. 5 is a lamp head having a three-stage impedance transformation, hence a multistage transformingly active section.

The circuit of FIG. 5 differs from the circuit illustrated in FIG. 4 by a high-ohmic configuration of an extended line piece 70 instead of the short feed line 56 previously provided in this place for realizing a series inductance, and by a purely capacitive coupling of the extended line piece 70 to the grounding formed by the tube 58. Furthermore, two small capacitors 72, 74 result from the first and second bent lines 64, 66 due to the line geometry. These capacitors are two gamma transformers connected in series (cf. H. Heuermann: "Hochfrequenztechnik", l.c.). The circuit illustrated in FIG. 5 having a multistage transformingly active section comprises the extended line piece 70, the two capacitors 72, 74 and the first and second bent lines 64, 66. A first transformer is formed by the series inductance of the extended line piece 70 and the ground-connected capacitance of a capacitor 72 resulting from the line geometry. A second transformer is formed by the series capacitance 60 of the second capacitor 74 resulting from the line geometry and a ground-connected inductance 64 of the second bent line. The third stage of the impedance transformation is as usual. The advantages of this slightly more complex circuit are higher transformation ratios and a larger spectrum. For both embodiments (FIG. 4 and FIG. 5) it applies that the high-frequency signal is supplied to the glass bulb 22 via a shielded waveguide structure (in that specific case the tube 58), which is formed by the configuration of the inner conductors 56, 64, 66, 68; 70, 64, 66, 68 so that an impedance transformation is included. Compared to HF antennas, this construction has the advantage that no HF emission takes place and the lamp thus is allowable. Moreover, the efficiency increases. The HF load (filled glass bulb 22 including the short feedthrough electrode 28) is very high-ohmic, whereby very high electric field intensities are given upon adaptation.

Figure 6:
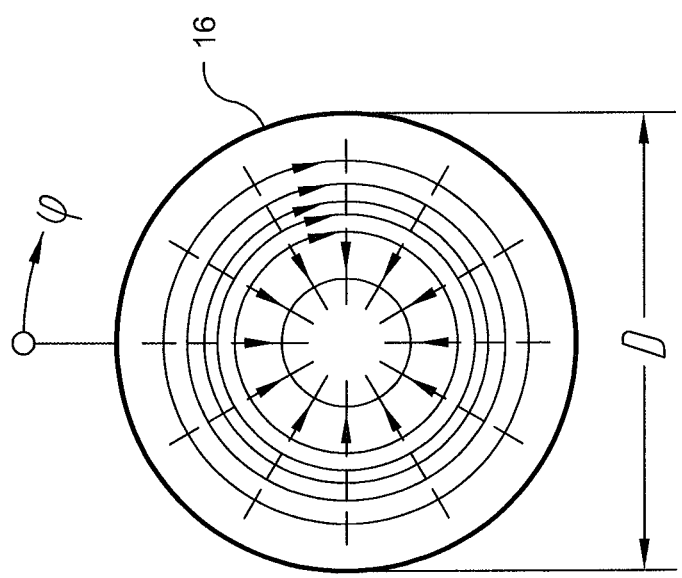
FIG. 6 is an $E_{01}$ mode in a circular waveguide (E-field dotted, H-field continuous)

Cavity modes are scientifically and technically very well examined and implemented in many components such as HF filters. The modes can exist as of a certain lower, so-called cutoff frequency. They are well used in technical engineering since the losses in the metal are very low. FIG. 6 illustrates a possible cavity mode ($E_{01}$). The same is very interesting for an implementation in a high-frequency lamp 10 (FIG. 1, FIG. 2, FIG. 3) for room illumination or other applications, since the electric field (and thus the plasma as well) has the optimal shape of a big ball. Lines of force, which propagate only parallel to the grounding faces, are only present in the relatively large ionization chamber 16. In addition, these strongest electric fields form a ring that guarantees a maximum luminous ball.

Figure 7:
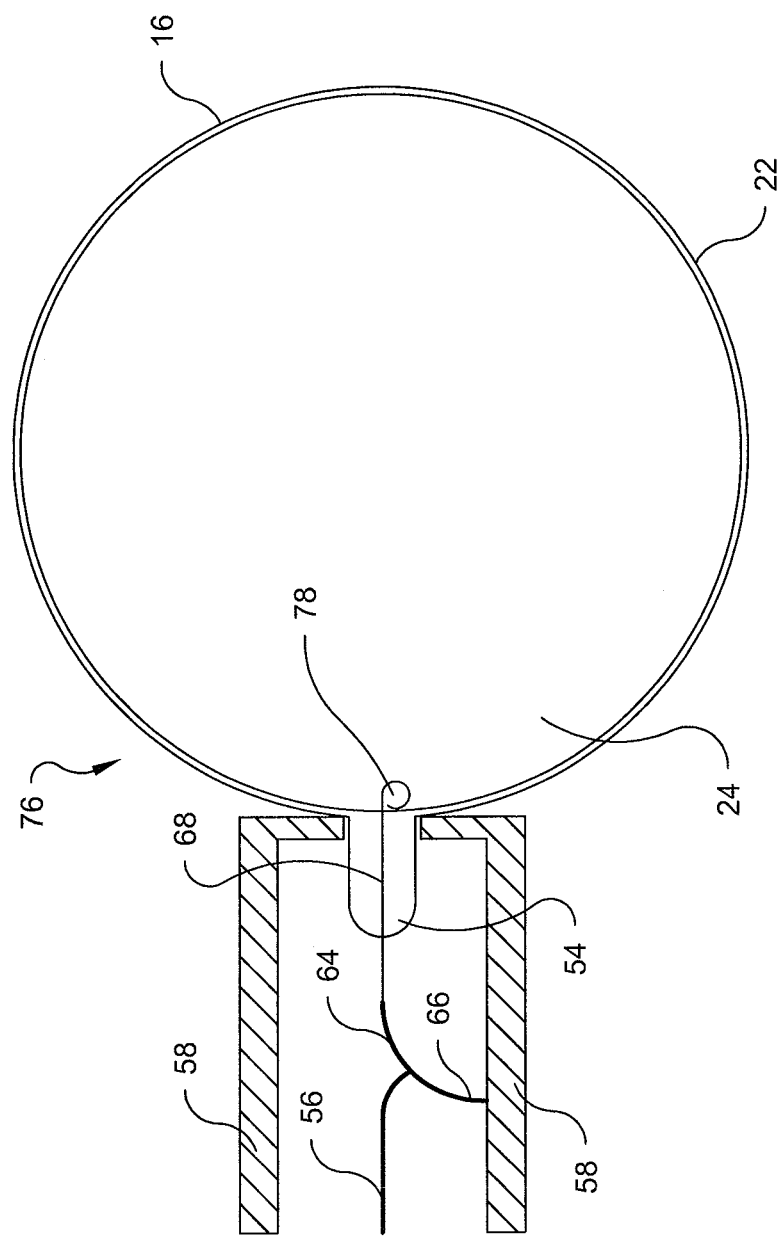
FIG. 7 is a cavity resonator lamp having a single-stage impedance transformation for the excitement of the $E_{01}$ mode in an asymmetric excitement.

One possible embodiment of the high-frequency lamp 10 (FIG. 1, FIG. 2, FIG. 3) as a cavity resonator lamp 76 (briefly: HR lamp) for exciting the $E_{01}$ mode is illustrated in FIG. 7. FIG. 7 shows the arrangement for the case that the HR lamp 76 had been designed in an asymmetric circuit technology (cf. FIG. 1 or FIG. 2). For both possible circuit technologies, the magnetic field is excited by a loop-shaped electrode 78. In this case, a symmetric solution (FIG. 3) prevents the occurrence of other undesired cavity modes even much better than the asymmetric solution. The loop-shaped electrode 78 of the HR lamp 76 is, therefore, nothing more than a coupling element for the resonator that is merely formed for the boundary of the possibly slightly metallized surfaces of the glass bulb 22. Using an adjustable coupling k (cf. H. Heuermann: "Hochfrequenztechnik," l.c.), a voltage transformation can be performed, on the other hand. This transformation (an important transformation may be generated by means of a weak coupling) is presented in H. Heuermann: "Hochfrequenztechnik," l.c., as a gamma transformation that slightly off-tunes the resonance frequency. The bandwidth decreases at an increasing transformation value.

In the presented case of the $E_{01}$ mode, the plasma ball (area of the largest currents in the plasma) forming in the ionization chamber 16 is only situated in the cavity and neither contacts the loop-shaped electrode 78 (electrodes 78, not shown, in a symmetric solution as per FIG. 3) nor the grounding. Of course, the entire volume of the ionization chamber 16 is ionized here as well. The ionization sections may be considered as ohmic resistances (loads) in a first approximation. Same "diminish" the reactive resonator range so that here, too, a frequency hopping is possibly useful.

The choice of the mode and the geometric shaping of the electrode have an influence on the maximum plasma range and the resulting input resistance $Z_{ein}$ of the HR lamp 76. Using 3D HF field simulators, the electromagnetic fields inside the glass bulb 22 may be visualized in orientation and absolute size. The area having the largest electric field intensities are the areas in which the largest plasma currents flow. These areas, which are thus the hottest, are consequently decoupled from the or each electrode 78.

The previous electrode designs only referred to the use of a metallic electrode 28, 52, 78. A very advantageous configuration of the invention is to use a purely dielectric electrode or a mixed structure of a metal core and a dielectric covering instead of the metallic electrode 28, 52, 78. If only a dielectric material (having a relatively high dielectric constant) is used as an electrode, HF technology talks about a dielectric wire or dielectric resonator. In the case of a dielectric wire, a hybrid fundamental wave $HE_{11}$ is preferably selected as a line mode. Depending on the coupling, further lower-loss modes may also be employed for the dielectric resonator. If a mixed structure of a metal core and a dielectric covering is used in contrast, a Goubau surface line (also called Goubau-Harms line) is formed that permits a very low-loss transmission from the two-digit MHz range up to the GHz range.

Figure 8:
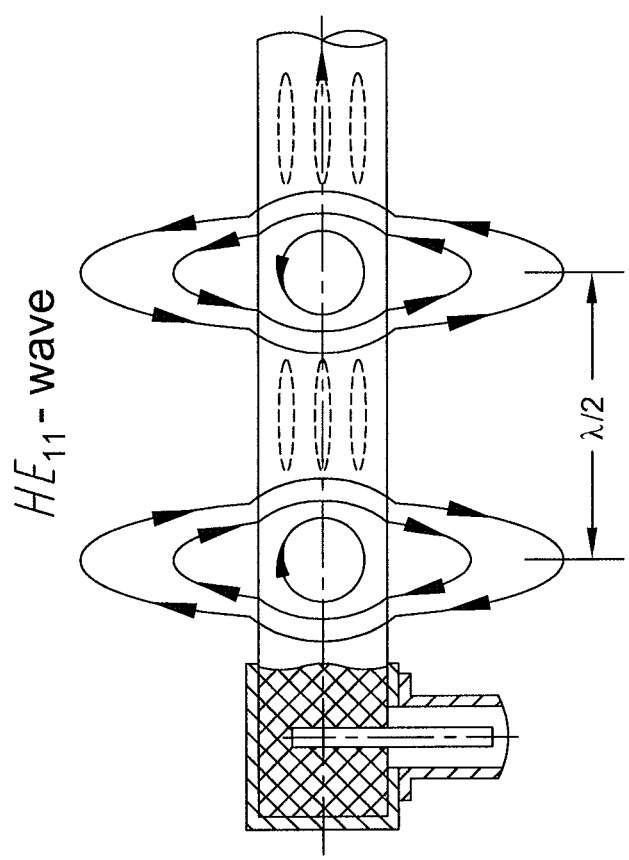
FIG. 8 is a coupling of a dielectric electrode for the excitement of a $HE_{11}$ basic mode.
Figure 9:
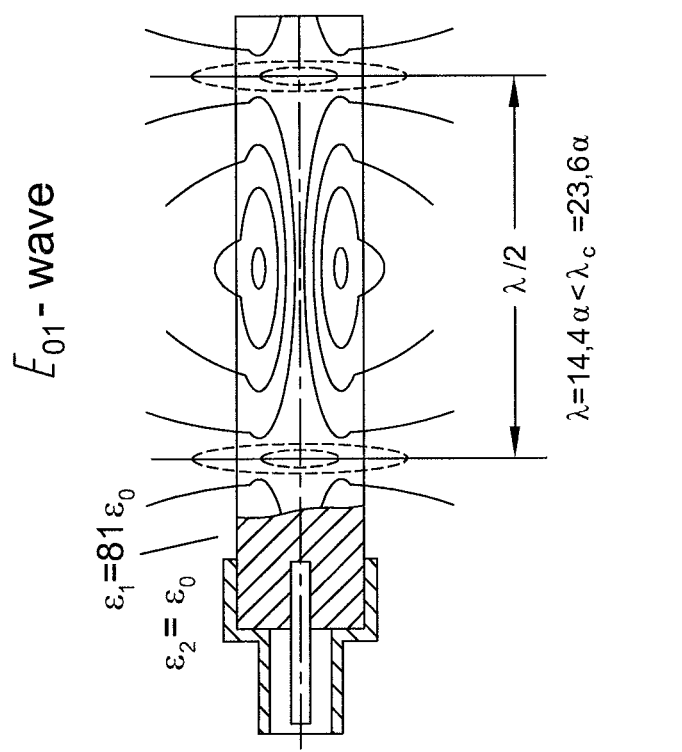
FIG. 9 is a coupling of a dielectric electrode for the excitement of the $E_{01}$ mode.

These two structures (in general, the dielectric electrode) may be used instead of the metallic electrode(s) 28; 52 or the loop-shaped electrode(s) 78 acting as a coupling element. In this case, the coupling structure of the elements e.g. described for this purpose in the embodiment as per FIG. 4, namely electrode 28, pressure insulation portion/glass feedthrough 54 and inner conductor 68 will change. Depending on the desired high-frequency mode, a wide spectrum of mechanical constructions may be applied. FIG. 8 shows one example of an excitement of the fundamental mode (which is capable of propagating as of 0 Hz). FIG. 9 shows a further example of the excitement of the $E_{01}$ mode, the implementability of which is very advantageous. The text comprised by FIG. 8 reads "$HE_{11}$ wave" and "$\lambda/2$". The text comprised by FIG. 9 reads "$E_{01}$ wave", "$\epsilon_1=81\ \epsilon_0$", "$\epsilon_2=\epsilon_0$", "$\lambda/2$" and "$\lambda=14.4\alpha<\lambda_c=23.6\alpha$".

Figure 10:
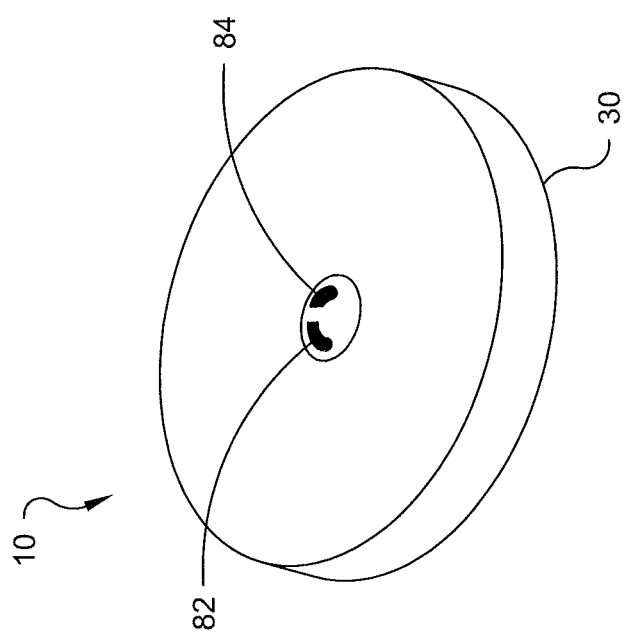
FIG. 10 is a simplified schematic representation of a high-frequency lamp over a grounding plate for a spotlight generation at a symmetric drive from one side.

As mentioned, the dielectric mode can be used in the HF lamp or HR lamp 10, 76 (FIGS. 1, 2, 3, respectively FIG. 7) in place of the usual electrodes 28, 52, 78. Nothing is changed in the waveguide mode of HR lamp 76. Only the geometric shaping of the dielectric wire must be optimized according to the coupling conditions. As a consequence, one passes from a coaxial mode to the mode of the dielectric conductor and finally to the spherical waveguide mode. This is slightly different in case of the high-frequency lamp 10. Here, less is changed in optical terms. FIG. 10, for instance, shows a high-frequency lamp 10 that, when including the dielectric electrode used, is also referred to as a dielectric lamp, over a grounding plate 80 (the glass bulb 22 is not illustrated) for a spotlight generation at a symmetric drive from one side, hence having two electrodes 82, 84, in one embodiment that can be realized by means of purely metallic, mixed or purely dielectric electrode materials. A metallic electrode, however, is an LC resonant circuit, and a dielectric electrode is a mode of the dielectric resonator. The type of realization shown in FIG. 10 generates in both cases a lighting of a spot source seated between the two electrodes 82, 84. This arrangement is an advantageous configuration of the high-frequency lamp 10 for high-pressure applications. When the resonator voltage is to be further increased in addition or as an alternative to the proceedings proposed here for increasing the electric field, then this is achieved by improving a "belastete Güte" (loaded quality). In DE 10 2004 054 443 (Heuermann, H., Sadeghfam, A., Lünebach, M.: "Resonatorsystem and Verfahren zur Erhöhung der belasteten Güte eines Schwingkreises") a great number of circuit engineering solutions is included that can also be used here. Correspondingly, the disclosure content of the above-mentioned DE 10 2004 054 443 in this respect herewith applies as being integrally included in the description of the invention being in the focus here.

In the following, further configurations or realization options of the invention will be presented at least in a cursory manner: A use of magnets allows a simple manipulation of the shaping of the ionization path. Since the electrode design, hence the shaping thereof with respect to form and dimension, is basically arbitrary, the high-frequency lamp 10 can also be used as a lighting means for high-effect advertising lamps. By an appropriate frequency selection, various ionizations paths can very rapidly be driven, which allows new ways for the lamp design. Areas having different luminophores (phosphors) and thus also different colors may be ionized inter alia. This allows a variant of display devices in the kind of a plasma TV set.

Even the classical plasma TV concept can be replaced by HF excitement. Two HF control signals driven in push-pull operation may be used instead of the NF control signals. An impedance transformation here as well allows for achieving high voltages at very low powers. In addition, the three colors of a pixel are at present further controlled via 3× two data lines. In comparison, one pixel can be controlled via only two lines using a frequency-division multiplex process. This design would improve the image resolution, among other things. Apart from the efficiency, the response time of all of the mentioned plasma TV variants could thereby be improved.

In conclusion, the present invention may thus be briefly described as follows: Proposed are novel constructions for the set-up of high-frequency lamps 10 for low-pressure and high-pressure applications, as well as a method for the operation thereof, which lend themselves in particular to improve the properties with respect to efficiency, emission spectrum, cost, and durability, with the use of an ignition unit being no longer required even at very low high-frequency powers thanks to an impedance transformer 26 connected downstream of a power amplifier 20, since the application of a voltage as high as possible to an ionization chamber 16 is successfully achieved by means of the impedance transformation. This high-frequency lamp 10 may thus be used both as a high-pressure and a low-pressure gas discharge lamp. Conventional starters are not required. Depending on the design, the high-frequency lamp 10 exhibits a small spot-shaped or a large spherical ionization area including large current flows and thus high color temperatures having a coverage of up to several $dm^2$, and allows for an arbitrary adjustment of the luminous efficiency. This dimmability and the improved light spectrum qualify the high-frequency lamp 10 for interior illuminations. The high durability, daylight spectrum, low cost, and high power-compatibility qualify the high-frequency lamp 10 having a spot-shaped high-current area for use in devices such as so-called beamers and projectors, and as vehicle headlights. Excellent efficiency ratios and highest color temperatures may be achieved thanks to this high-frequency lamp 10, inter alia by the use of dielectric electrodes. The high-frequency lamp 10 may be produced in a very cost-efficient manner, using high-frequency electronic components that are available at very low cost due to the telecommunications market, and the usual gas-discharge lamp technology, particularly since the high-voltage requirements are clearly lower compared to classical starter circuits.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A high-frequency lamp (10) comprising a signal generating portion (12) for generating a high-frequency signal (14), and an ionization chamber (16) connected downstream of the signal generating portion,
    wherein the signal generating portion (12) comprises a switchable high-frequency oscillator (18), and at the output thereof a power amplifier (20) for increasing a power of the high-frequency signal (14),
    wherein the ionization chamber (16), which comprises at least one gas-filled glass bulb (22), has at least one electrode (28) associated,
    wherein an impedance transformer (26), which is at its output in connection with the at least one electrode (28), is connected downstream of the power amplifier (20),
    wherein the signal generating portion (12) in addition comprises a coupler (36) connected downstream of the power amplifier (20), in particular arranged between the power amplifier (20) and the impedance transformer (26), a high-frequency detector (38) and a processing unit (34),
    wherein a high-frequency signal reflected at the at least one electrode (28) during the operation of the high-frequency lamp (10) is supplied to the high-frequency detector (38) via the coupler (36), and
    wherein a control signal is generated by the processing unit (34) as an actuating signal (35) based on an output signal of the high-frequency detector (38) is supplied to the high-frequency oscillator (18) for optimizing the high-frequency signal (14) based on the reflected signal.

2. The high-frequency lamp (10) according to claim 1, wherein the at least one electrode (28) is dielectric, in particular formed by a metal core enclosed by a dielectric covering.

3. The high-frequency lamp (10) according to claim 1, further includes a loop-shaped electrode (78).

4. The high-frequency lamp (10) according to claim 1, wherein the glass bulb (22) is filled with a mixture of at least two gases, in particular exactly three gases having different emission spectra.

5. The high-frequency lamp (10) according to claim 1, wherein the ionization chamber (16) comprises three glass bulbs (22), each individually filled with a gas having different emission spectra, and wherein each glass bulb (22) has an electrode (28) associated for supplying a high-frequency signal (14).

6. A high-frequency lamp (10) comprising a signal generating portion (12) for generating a high-frequency signal (14), and an ionization chamber (16) connected downstream of the signal generating portion,
    wherein the signal generating portion (12) comprises a switchable high-frequency oscillator (18), and at the output thereof a power amplifier (20) for increasing a power of the high-frequency signal (14),
    wherein the ionization chamber (16), which comprises at least one gas-filled glass bulb (22), has at least one electrode (28) associated,
    wherein an impedance transformer (26), which is at its output in connection with the at least one electrode (28), is connected downstream of the power amplifier (20), and
    wherein a signal splitter (40) having first and second signal splitter outputs (42, 44) is connected downstream of the high-frequency oscillator (18), and the power amplifier (20) is connected to the first signal splitter output (42),
    wherein a means for phase-shifting (46), a second power amplifier (48), a second impedance transformer (50), and a second electrode (52) are connected in series to the second signal splitter output (44).

7. The high-frequency lamp (10) according to claim 6, wherein the impedance transformer (26), respectively the impedance transformer and/or the second impedance transformer (50) comprise a single-stage or multistage transformingly active portion (56, 66, 64; 70, 74, 66, 64).

8. A method for operating a high-frequency lamp (10) comprising a signal generating portion (12) for generating a high-frequency signal (14), and an ionization chamber (16) connected downstream of the signal generating portion, wherein the signal generating portion (12) comprises a switchable high-frequency oscillator (18), and at the output thereof a power amplifier (20) for increasing a power of the high-frequency signal (14), wherein the ionization chamber (16), which comprises at least one gas-filled glass bulb (22), has at least one electrode (28) associated, and wherein an impedance transformer (26), which is at its output in connection with the at least one electrode (28), is connected downstream of the power amplifier (20), the method comprising:
 generating the high-frequency signal (14) by the high-frequency oscillator (18), wherein the power of the high-frequency signal (14) is increased by the power amplifier (20) connected downstream,
 transforming the high-frequency signal (14) into the high-voltage range by the impedance transformer connected downstream of the power amplifier (20), and
 supplying the transformed high-frequency signal (14) to the at least one electrode (28),
 detecting by a high-frequency detector (38) the high-frequency signal reflected at the electrode (28) upon an ignition of the high-frequency lamp (10) and forwarded via a coupler (36), and
 adapting by a processing unit (34), in particular varying a control signal (32) by a predetermined positive or negative value based on the output signal of the high-frequency detector (38) for optimizing the high-frequency signal (14), and generating a corresponding actuating signal (35) based on the control signal (32) and the output signal of the high-frequency detector (38).

9. The method for operating a high-frequency lamp (10) according to claim 8, wherein the impedance transformer (26; 50) transforms the high-frequency signal in one stage or a plurality of stages.

10. The method for operating a high-frequency lamp (10) according to claim 8, wherein at least two high-frequency signals (14) are generated by the high-frequency oscillator (18) and supplied to the at least one electrode (28).

11. The method for operating a high-frequency lamp (10) according to claim 8, wherein at least two high-frequency signals (14) are generated by the high-frequency oscillator (18), and each high-frequency signal (14) is supplied to exactly one of the at least two electrodes (28).

12. A method for operating a high-frequency lamp (10) comprising a signal generating portion (12) for generating a high-frequency signal (14), and an ionization chamber (16) connected downstream of the signal generating portion, wherein the signal generating portion (12) comprises a switchable high-frequency oscillator (18), and at the output thereof a power amplifier (20) for increasing a power of the high-frequency signal (14), wherein the ionization chamber (16), which comprises at least one gas-filled glass bulb (22), has at least one electrode (28) associated, and wherein an impedance transformer (26), which is at its output in connection with the at least one electrode (28), is connected downstream of the power amplifier (20), the method comprising:
 generating the high-frequency signal (14) by the high-frequency oscillator (18), wherein the power of the high-frequency signal (14) is increased by the power amplifier (20) connected downstream,
 transforming the high-frequency signal (14) into the high-voltage range by the impedance transformer connected downstream of the power amplifier (20), and
 supplying the transformed high-frequency signal (14) to the at least one electrode (28),
 splitting off by a signal splitter (40) a second high-frequency signal (14') from the high-frequency signal (14) in particular in such a manner that a high-frequency signal remaining as a high-frequency signal (14), and a second high-frequency signal (14') are at least essentially identical,
 shifting by means for phase-shifting (46) the second high-frequency signal (14') in phase, wherein a second power amplifier (48) connected downstream increases the power of the phase-shifted second high-frequency signal (14'), and
 transforming by a second impedance transformer (50) connected downstream the resulting second high-frequency signal (14') in one stage or a plurality of stages and forwarding it to a second electrode (52).

* * * * *